US012535759B2

(12) United States Patent
Shinagawa

(10) Patent No.: US 12,535,759 B2
(45) Date of Patent: Jan. 27, 2026

(54) PRINTING APPARATUS CAPABLE OF CONTROLLING A STATIC ELECTRICITY ELIMINATION APPARATUS, CONTROL METHOD FOR CONTROLLING PRINTING APPARATUS, AND STORAGE MEDIUM

(71) Applicant: CANON KABUSHIKI KAISHA, Tokyo (JP)

(72) Inventor: Kazutaka Shinagawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/670,571

(22) Filed: May 21, 2024

(65) Prior Publication Data

US 2024/0393723 A1 Nov. 28, 2024

(30) Foreign Application Priority Data

May 26, 2023 (JP) ................................ 2023-086808

(51) Int. Cl.
*G03G 15/00* (2006.01)
*B65H 37/00* (2006.01)

(52) U.S. Cl.
CPC ......... *G03G 15/5016* (2013.01); *B65H 37/00* (2013.01); *B65H 2301/5133* (2013.01); *B65H 2551/18* (2013.01)

(58) Field of Classification Search
CPC ........... G03G 15/0266; G03G 15/5016; G03G 15/6573; G03G 21/06; B65H 37/00
See application file for complete search history.

(56) References Cited

U.S. PATENT DOCUMENTS

2014/0363181 A1* 12/2014 Michishita ......... G03G 15/1665 399/45
2018/0081317 A1* 3/2018 Kasuga .............. G03G 15/6582
2024/0353786 A1* 10/2024 Iwasaki .............. G03G 15/5016

FOREIGN PATENT DOCUMENTS

JP H11258881 A 9/1999

* cited by examiner

*Primary Examiner* — Hoang X Ngo
(74) *Attorney, Agent, or Firm* — Canon U.S.A., Inc. IP Division

(57) ABSTRACT

A control method for controlling a printing apparatus includes storing a static elimination setting value with respect to each sheet, printing an image on a sheet, and in a case where the static elimination setting value stored for the sheet is a numerical value, performing control to eliminate static from the sheet based on the numerical value by using a static elimination apparatus, and in a case where the setting value stored for the sheet is a setting value indicating that a setting value of a hardware setting unit of the static elimination apparatus is used, performing control to eliminate static from the sheet based on a setting value set by using the hardware setting unit.

9 Claims, 13 Drawing Sheets

PRINTING APPARATUS CAPABLE OF CONTROLLING A STATIC ELECTRICITY ELIMINATION APPARATUS, CONTROL METHOD FOR CONTROLLING PRINTING APPARATUS, AND STORAGE MEDIUM

BACKGROUND

Field of the Disclosure

The present disclosure relates to a printing apparatus, a control method for controlling a printing apparatus, and a storage medium.

Description of the Related Art

A recording medium (hereinafter referred to as a "sheet") used in printing work is conveyed in the state where the sheet is charged with static due to residual charges in the process of an electrophotographic process or slight friction with a conveyance roller or a guide that occurs while the sheet is conveyed. Sheets may then stick together due to this static. The attachment of dust or paper dust to a final product may also cause a decrease in the quality of the final product.

In the case of plain paper, the electrical resistance of the sheet itself is low, and charges are likely to move in the sheet. Thus, the amount of charge itself of the plain paper is small, and the charges are quickly canceled out. In contrast, in the case of a sheet using a synthetic resin (a plastic), such as thick paper, synthetic paper, or coated paper, the electrical resistance of the sheet is high, and charges are less likely to move in the sheet. As a result, there is therefore a tendency that a sheet, such as synthetic paper or coated paper, is likely to be charged, and charges are likely to remain in the sheet. It is generally known that a sheet is likely to be influenced by an environment, particularly humidity, and when the humidity of the environment is lower, the sheet is more likely to be charged with static, under the influence of a decrease in the amount of discharge in the air. Plain paper having a high moisture content is likely to be influenced by humidity, but the amount of charge itself of the plain paper is small. On the other hand, a sheet using a synthetic resin having a low moisture content is less likely to be influenced by humidity but is likely to be influenced by charging.

If post-processing is performed in the state where sheets stick together, this influences the process of aligning the sheets. Thus, not only may the quality of the post-processing decrease, but also a jam may be caused due to a sheet feeding failure or a conveyance failure when the post-processing is performed. This can damage the sheets or a device.

Thus, to prevent such a risk from occurring, it is desirable to eliminate static from the sheets after a printing step before the post-processing is performed. Accordingly, a technique for canceling out charges charged in a sheet by applying a voltage to a pair of conveyance rollers located downstream in the conveyance direction of the sheet is discussed (see the publication of Japanese Patent Application Laid-Open No. 11-258881).

In static elimination by a configuration in which a voltage is applied to conveyance rollers (hereinafter referred to as "static elimination rollers"), charges opposite to charges charged in a sheet are applied to the sheet via the static elimination rollers, thereby canceling out charged static. Thus, static elimination control by the static elimination rollers (the application of charges opposite to charges in the sheet to the static elimination rollers) needs to be performed according to the amount of charge in the sheet. This is because there is a charge adjustment value for optimal static elimination with respect to each print environment, such as humidity, or each sheet brand.

Regarding the adjustment of the optimal static elimination, if a configuration is employed in which the static elimination can be adjusted using hardware, the static elimination can be directly adjusted while the result of the adjustment is confirmed. Thus, it is easy to adjust the static elimination. However, in terms of operability, it is difficult to prepare a hardware adjustment function capable of handling a plurality of types of sheets. Thus, the adjustment for a single sheet is assumed. If, on the other hand, a configuration is employed in which the static elimination can be adjusted using software, it is possible to handle a plurality of types of sheets, whereas it is troublesome to frequently adjust a sheet likely to be influenced by an environment, such as plain paper. It is desirable to achieve these two configurations with excellent usability.

SUMMARY

According to an aspect of the present disclosure, a printing apparatus includes a printing unit configured to print an image on a sheet, one or more memories configured to store a respective static elimination setting value with respect to each sheet of one or more sheets, and one or more processors. The one or more processors are configured to perform, in a case where the respective static elimination setting value stored for the sheet is a numerical value, control to eliminate static from the sheet based on the numerical value by using a static elimination apparatus, and to perform, in a case where the respective setting value stored for the sheet is a setting value indicating that a setting value of an input device of the static elimination apparatus is used, control to eliminate static from the sheet based on the setting value set by using the input device.

Further features of various embodiments will become apparent from the following description of exemplary embodiments with reference to the attached drawings.

DESCRIPTION OF THE EMBODIMENTS

Exemplary embodiments will be described below with reference to the drawings.

The following exemplary embodiments do not limit every embodiment according to the appended claims, and not all the combinations of the features described in the exemplary embodiments are essential for a method for solving the issues in the disclosure.

Figure 1:
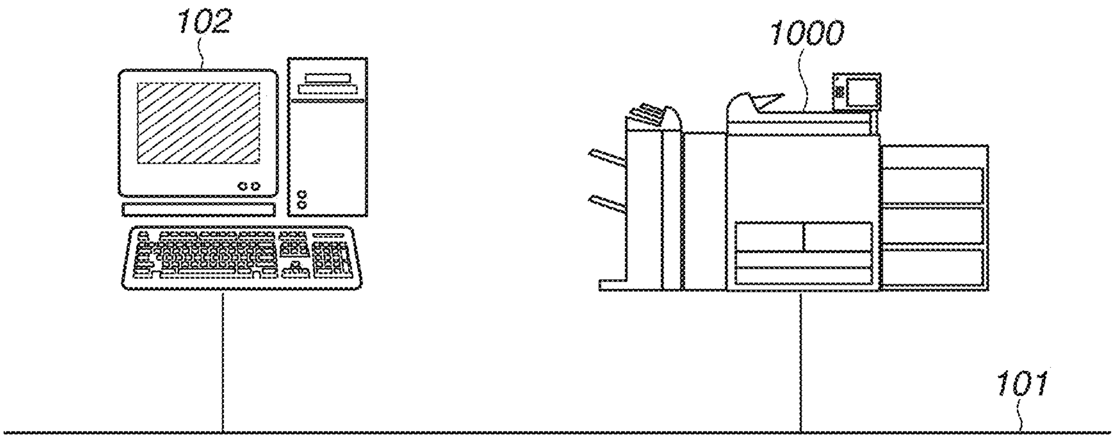
FIG. 1 is a diagram illustrating a minimum system configuration according to the present exemplary embodiment.

FIG. 1 illustrates a simple configuration according to a first exemplary embodiment, which includes an image forming apparatus 1000 and a client computer 102 (hereinafter referred to as a "personal computer (PC) 102") connected to each other via a network 101. The PC 102 can then transmit page description language (PDL) code data as a print job to the image forming apparatus 1000 via the network 101.

Figure 2:
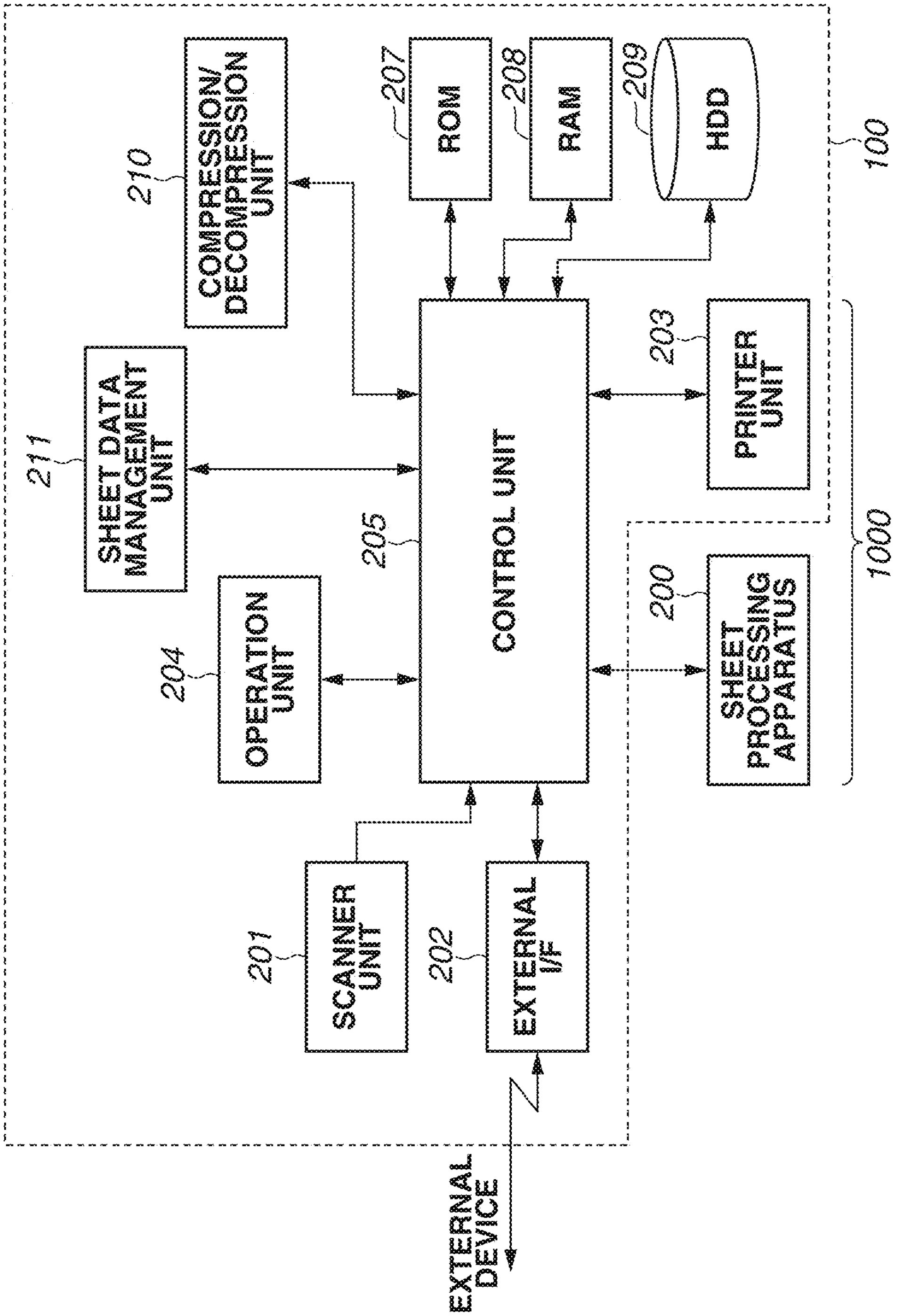
FIG. 2 is a software block diagram of a printing apparatus.

The image forming apparatus 1000 will now be described with reference to a system block diagram in FIG. 2. The image forming apparatus 1000 includes a printing apparatus 100, which is a portion surrounded by a dotted line in FIG. 2, and a sheet processing apparatus 200. To the printing apparatus 100, any number of sheet processing apparatuses 200 can be connected. The present exemplary embodiment is described taking a multifunction peripheral (MFP) having a plurality of functions, such as a copy function and a printer function, as an example of the printing apparatus 100. The printing apparatus 100, however, may be a single-function printing apparatus having only a copy function or only a printer function. In the present exemplary embodiment, as an example, the image forming apparatus 1000 includes various components described below.

The image forming apparatus 1000 is configured such that the sheet processing apparatus 200 connected to the printing apparatus 100 can execute sheet processing on a sheet subjected to printing by the printing apparatus 100. The image forming apparatus 1000, however, can also include only the printing apparatus 100 without connecting the sheet processing apparatus 200 to the printing apparatus 100. The sheet processing apparatus 200 is configured to communicate with the printing apparatus 100. The sheet processing apparatus 200 can receive an instruction from the printing apparatus 100 and execute sheet processing as described below.

A scanner unit 201 reads an image on a document, converts the image into image data, and transfers the image data to another unit.

An external interface (I/F) 202 transmits and receives data to and from another apparatus connected to the network 101.

A printer unit 203 prints an image based on image data input to the printer unit 203 on a sheet.

Figure 4:
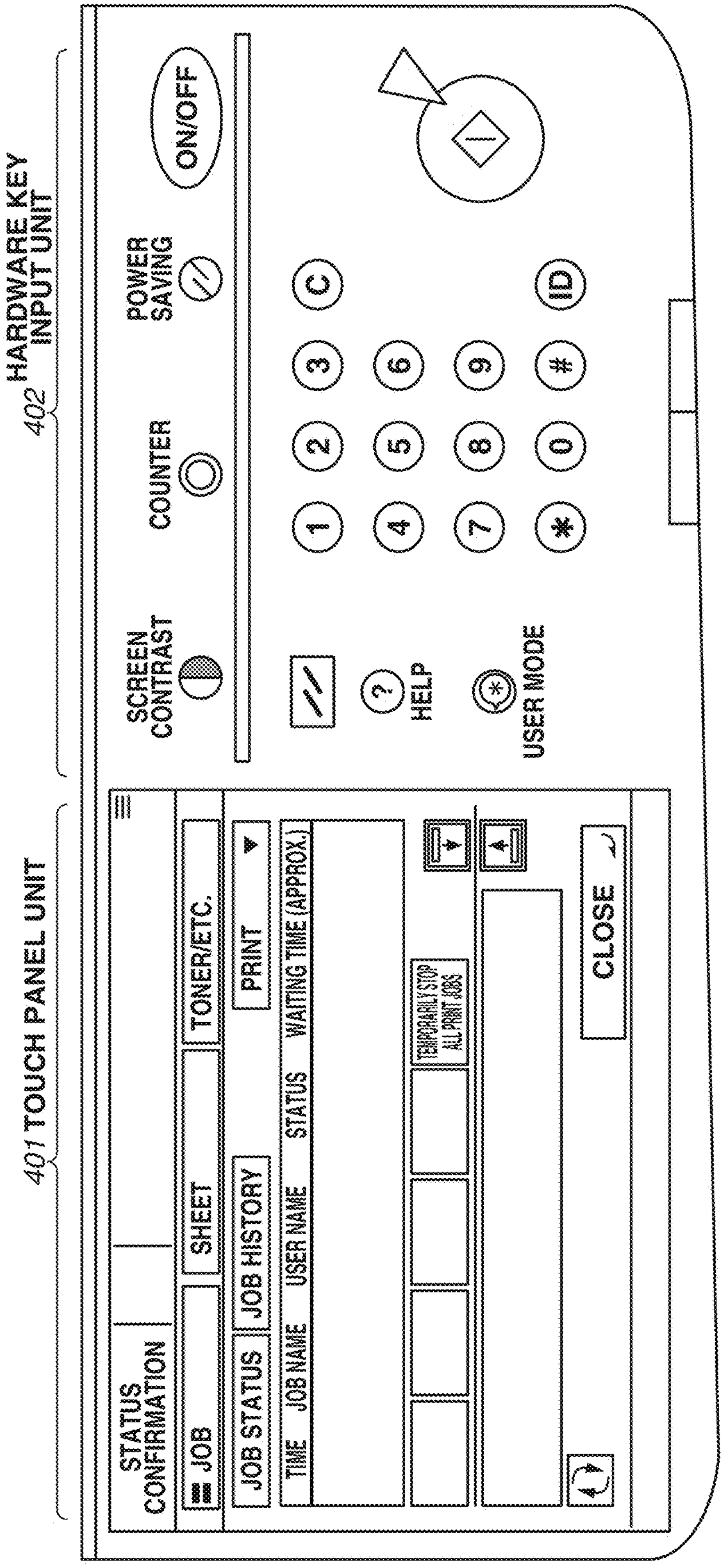
FIG. 4 is a diagram illustrating an operation unit included in the printing apparatus.

An operation unit 204 has a configuration as illustrated in FIG. 4. The operation unit 204 includes a hardware key input unit (key input unit) 402 and a touch panel unit 401 and receives an instruction from a user through the hardware key input unit 402 and the touch panel unit 401. The operation unit 204 also performs various types of display on the touch panel unit 401 included in the operation unit 204.

A control unit 205 performs overall control of the processing and the operations of various units included in the image forming apparatus 1000 and is specifically a central processing unit (CPU). That is, the control unit 205 also controls the operations of the printing apparatus 100 and the sheet processing apparatus 200 connected to the printing apparatus 100.

A read-only memory (ROM) 207 stores various computer programs executed by the control unit 205.

For example, the ROM 207 stores a program for causing the control unit 205 to execute various types of processing in flowcharts described below and a display control program used to display various settings screens described below. The ROM 207 also stores a program for the control unit 205 to execute the operation of interpreting PDL code data received from the PC 102 and rasterizing the PDL code data into raster image data. Additionally, the ROM 207 also stores a boot sequence and font information.

A random-access memory (RAM) 208 stores image data and PDL code data sent from the scanner unit 201 or the external I/F 202, various programs loaded from the ROM 207, and setting information. The RAM 208 also stores information regarding the sheet processing apparatus 200 (information regarding the type and the function of each sheet processing apparatus 200 connected to the printing apparatus 100). The control unit 205 can use the information regarding the sheet processing apparatus 200 that is stored in the RAM 208 for control.

A hard disk drive (HDD) 209 includes a hard disk and a driving unit that reads and writes data from and to the hard disk. The HDD 209 is a large-capacity storage device for storing image data input from the scanner unit 201 and compressed by a compression/decompression unit 210.

Based on an instruction from the user, the control unit 205 can cause the printer unit 203 to print image data stored in the HDD 209. The HDD 209 is also used as a spooler, and the control unit 205 can manage PDL code data received from the PC 102 as a print job and store the print job in the HDD 209. The control unit 205 can also manage a print job stored in the HDD 209. The control unit 205 can also acquire the number of print jobs stored in the HDD 209 and setting information regarding settings made for each print job.

Based on various compression methods, such as Joint Bi-level Image Experts Group (JBIG) and Joint Photographic Experts Group (JPEG), the compression/decompression unit 210 performs the operations of compressing and decompressing image data stored in the RAM 208 or the HDD 209.

A sheet data management unit 211 manages information regarding control parameters used when a sheet is printed, priority information regarding static elimination control parameters, and environmental change influence information with respect to each sheet type, and further with respect to each sheet brand. Examples of the control parameters include information regarding the grammage of the sheet, the surface property of the sheet, a voltage adjustment value when an image is transferred, and an adjustment value of a static elimination bias when static elimination control is performed. Although the block diagram is thus illustrated, the sheet data management unit 211 is actually a database that stores a sheet information table, and this database itself is stored in the HDD 209.

Table 1 illustrates a specific example of the sheet information table.

TABLE 1

| Name | Grammage | Size | Surface Property | Feature | Environmental change influence | Adjustment of Static Elimination Bias |
|---|---|---|---|---|---|---|
| Plain Paper | 70 | A4 | High-quality paper | Absent | Small | +10 |
| Synthetic Paper | 165 | A4 | Polypropylene | Absent | Large | Follow setting of HW switch |
| Thick Paper | 110 | A4 | High-quality paper | Absent | Small | +15 |

In the sheet information table, a column “name” stores the name of the sheet, such as “plain paper”, “synthetic paper”, or “thick paper”. A column “grammage” stores the grammage indicating the thickness of the sheet. A column “size” stores the size of the sheet. A column “surface property” stores information regarding the surface property of the sheet, such as “high-quality paper” or “polypropylene”. A column “feature” stores information regarding the feature of the sheet. A column “environmental change influence” stores the magnitude of a change in the amount of charge in a case where an environment changes. A column “adjustment of static elimination bias” stores parameter information used to adjust a priority setting, such as a specific adjustment value or “follow setting of HW switch”.

Figure 8A:
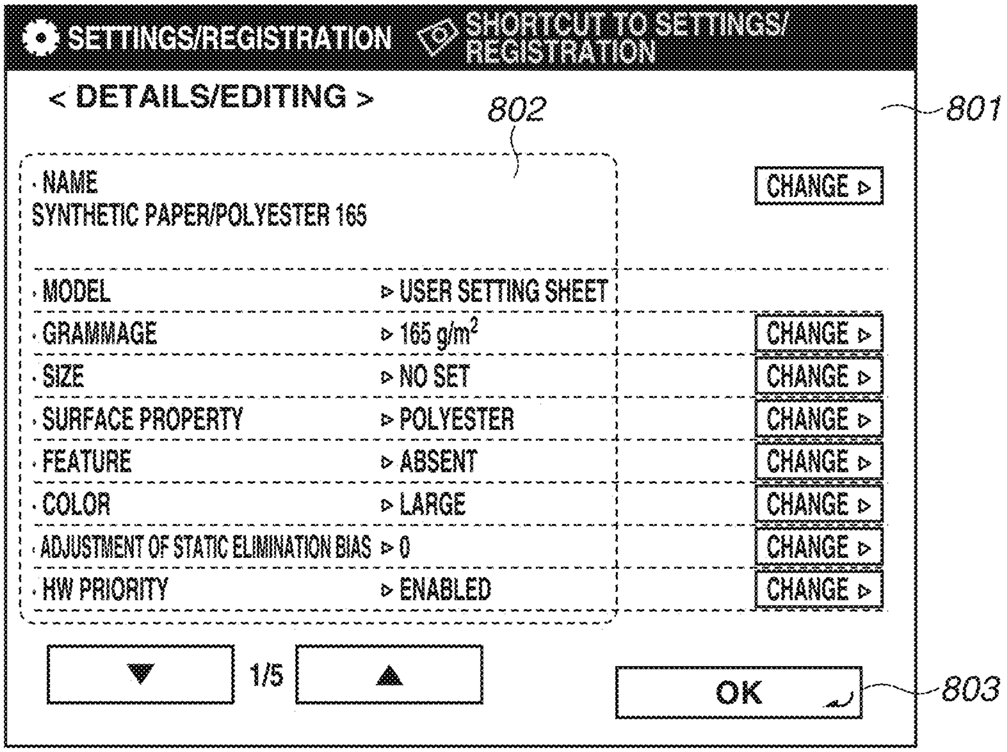
FIGS. 8A and 8B are diagrams illustrating sheet database reference/change screens via a sheet data management unit.
Figure 8B:
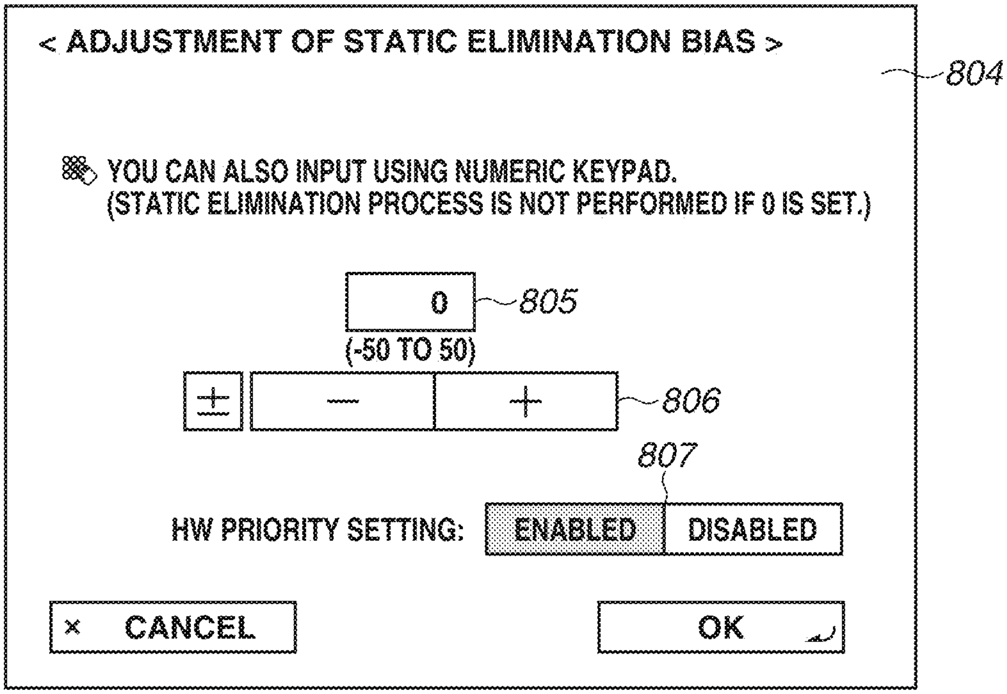

The sheet data management unit 211 includes dedicated screens for referring to and editing the contents of the sheet information table. FIGS. 8A and 8B illustrate examples of the dedicated screens. The image forming apparatus 1000 is configured such that the user can call a setting screen with respect to each sheet through the operation unit 204. If the control unit 205 receives this calling, the control unit 205 displays a parameter list screen 801 for the sheet in FIG. 8A on the touch panel unit 401 of the operation unit 204.

The parameter list screen 801 includes a field 802 that displays the parameters and the current setting values of the parameters. Each of the parameters has a [change] button to be pressed to change the setting value. For example, if a [change] button 803 is pressed by the user to change the parameter of the adjustment of the static elimination bias, the control unit 205 displays an “adjustment of static elimination bias” screen 804 in FIG. 8B on the touch panel unit 401 of the operation unit 204. The “adjustment of static elimination bias” screen 804 includes a field that displays a current adjustment value 805 of the static elimination bias and an input button 806 for inputting an increase or decrease in the setting value. The user can then set a bias voltage for a static elimination process to be performed on this sheet by a static elimination apparatus 200-3*a*. In the present exemplary embodiment, a configuration is employed in which, as the bias voltage for the static elimination process set here, not a direct voltage value [kV] but an intensity level having a sign “+” or “−” is set in the range of −50 to 50. As an actual operation for the setting made here, for example, control is performed to apply a voltage of 0.1 kV to a static elimination roller with respect to each level. The unit of the setting value and the range where the bias voltage can be set illustrated here are merely examples and are not limited to these contents. In a hardware (HW) priority setting 807 for setting the on/off state of HW priority, the user sets which of the bias voltage set on the “adjustment of static elimination bias” screen 804 and a bias voltage set using an adjustment dial 602 of an operation unit 502 of the static elimination apparatus 200-3*a* is enabled. As an example of another parameter, in the item “environmental change influence”, an environmental change influence mainly regarding humidity can be set considering the moisture content of the sheet.

The control unit 205 is then configured to access the sheet information table via the sheet data management unit 211 and acquire the feature information regarding the sheet for use in printing and the parameter information for use in print control.

(Hardware Configuration of Image Forming Apparatus)

Figure 3:
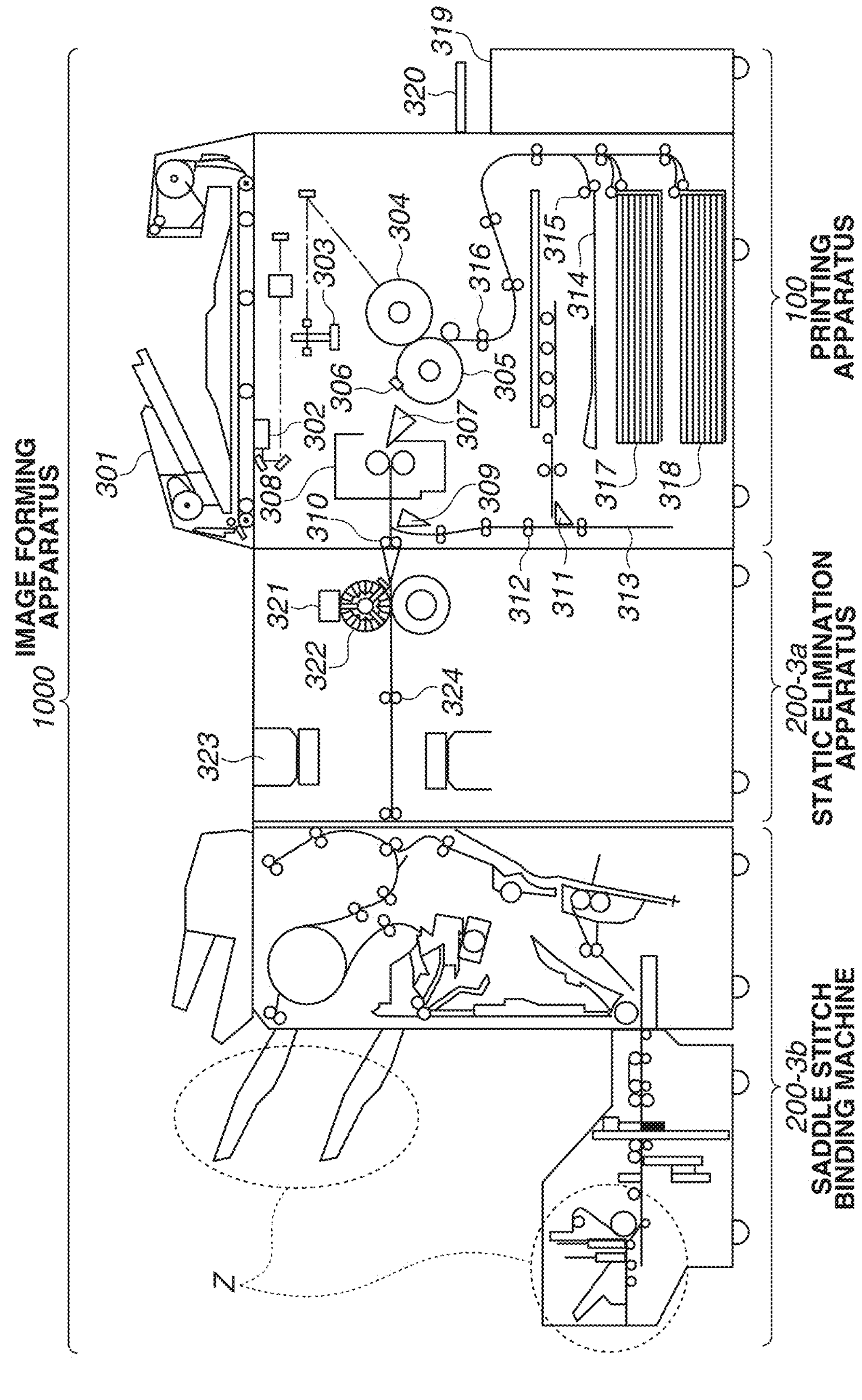
FIG. 3 is a cross-sectional view of an image forming apparatus.

The hardware configuration of the image forming apparatus 1000 will now be described with reference to FIG. 3. FIG. 3 is a cross-sectional view of the printing apparatus 100 and the sheet processing apparatus 200 connected to the printing apparatus 100. FIG. 3 illustrates a configuration in which the image forming apparatus 1000 includes a static elimination apparatus 200-3*a* and a saddle stitch binding machine 200-3*b* as the sheet processing apparatus 200.

(Printing Apparatus)

First, the printing apparatus 100 is described. An automatic document feeder (ADF) 301 separates a bundle of documents set on a stacking surface of a document tray in page order from the document of the first page and conveys the document onto document platen glass so that a scanner 302 scans the document. The scanner 302 reads an image on the document conveyed onto the document platen glass and converts the image into image data using a charge-coupled device (CCD). A rotary polygon mirror (e.g., a polygon mirror) 303 makes a light beam, such as laser light, modulated according to the image data incident and irradiates a photosensitive drum 304 with the laser light as reflected scanning light via a reflection mirror.

A latent image formed on the photosensitive drum 304 by the laser light is developed using toner, and this toner image is transferred to a sheet material attached to a transfer drum 305. A series of operations of this image formation process is sequentially executed using toner of yellow (Y), magenta (M), cyan (C), and black (K), thereby forming a full-color image. After the image formation process is performed four times, the sheet material on the transfer drum 305 on which the full-color image is formed is separated by a separation claw 306 and conveyed to a fixing device 308 by a pre-fixing conveyance device 307. The fixing device 308 includes a combination of a roller and a belt and has a heat source, such as a halogen heater, built-in. The fixing device 308 melts and fixes, by heat and pressure, the toner on the sheet material to which the toner image is transferred. A sheet discharge flapper 309 is configured to swing about a swing shaft and defines the conveyance direction of the sheet material. When the sheet discharge flapper 309 swings in the clockwise direction in FIG. 3, the sheet material is conveyed straight and discharged to outside the apparatus by sheet discharge rollers 310. The control unit 205 controls the printing apparatus 100 to execute one-sided printing through the above sequence.

On the other hand, in a case where images are formed on both sides of the sheet material, the sheet discharge flapper 309 swings in the counterclockwise direction in FIG. 3. The course of the sheet material is changed to the down direction, and the sheet material is fed to a two-sided conveyance unit. The two-sided conveyance unit includes a reverse flapper 311, reverse rollers 312, a reverse guide 313, and a two-sided tray 314. The reverse flapper 311 swings about a swing shaft and defines the conveyance direction of the sheet material. In a case where the control unit 205 processes a two-sided print job, the control unit 205 performs control to swing the reverse flapper 311 in the counterclockwise direction in FIG. 3, thereby feeding the sheet on the first side of which printing is completed by the printer unit 203 to the reverse guide 313 via the reverse rollers 312. The control unit 205 then performs control to temporarily stop the reverse rollers 312 in the state where the rear end of the sheet material is nipped by the reverse rollers 312, and subsequently swing the reverse flapper 311 in the clockwise direction in FIG. 3. The control unit 205 also performs control to rotate the reverse rollers 312 in the opposite direction. Consequently, the control unit 205 performs control to switch back the sheet, convey the sheet, and guide the sheet to the two-sided tray 314 in the state where the rear and front ends of the sheet are switched. The two-sided tray 314 temporarily stacks the sheet material, and then, sheet re-feeding rollers 315 feed the sheet material to registration rollers 316 again. At this time, the sheet material is sent in the state where the opposite side of the transfer step on the first surface is opposed to the photosensitive drum 304. The control unit 205 then performs control to form an image of the second surface on the second side of the sheet similarly to the above process. The images are then formed on both sides of the sheet material, and the sheet is subjected to the fixing step and discharged from the inside of the main body of the printing apparatus 100 to outside the apparatus via the sheet discharge rollers 310.

The control unit 205 controls the printing apparatus 100 to execute two-sided printing through the above process.

The printing apparatus 100 also includes sheet feeding units that store sheets to be used in a printing process. The sheet feeding units include sheet feeding cassettes 317 and 318 (each of which can store 500 sheets, for example), a sheet feeding deck 319 (which can store 5000 sheets, for example), and a manual feed tray 320. In the sheet feeding cassettes 317 and 318 and the sheet feeding deck 319, various sheets different in size and material can be set by distinguishing the sheets with respect to each sheet feeding unit. In the manual feed tray 320, various sheets including a special sheet, such as an overhead projector (OHP) sheet, can be set.

(Static Elimination Apparatus)

Figure 5:
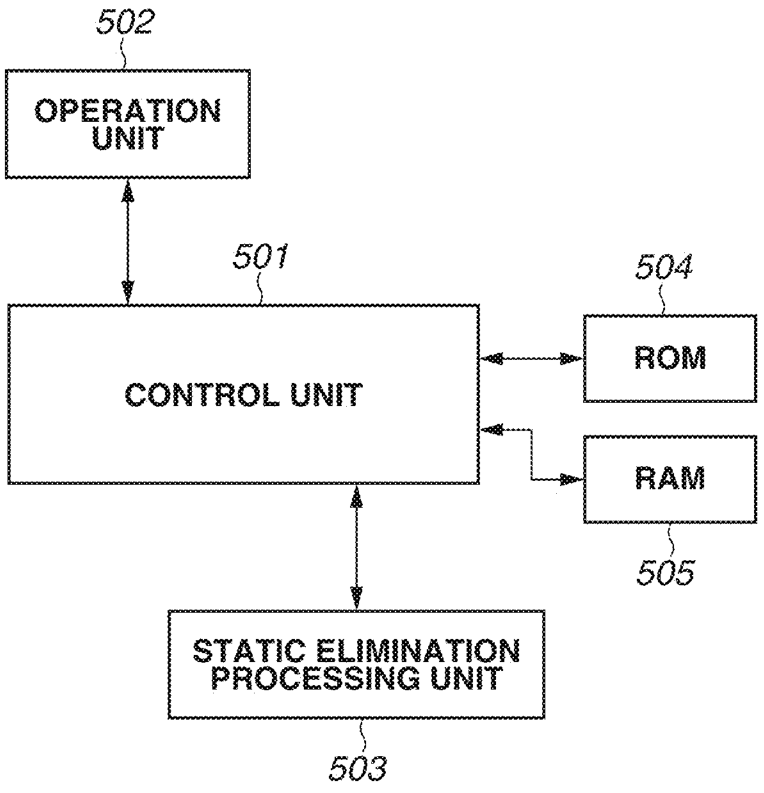
FIG. 5 is a software block diagram of a static elimination apparatus.

Next, the static elimination apparatus 200-3*a* is described. FIG. 5 illustrates a system block diagram of the static elimination apparatus 200-3*a*. The static elimination apparatus 200-3*a* also includes a control unit 501 that is a CPU separate from the printing apparatus 100. The control unit 501 performs overall management of the entirety of the static elimination apparatus 200-3*a* while communicating with the control unit 205 of the printing apparatus 100 illustrated in FIG. 2 via a bus (not illustrated).

(Operation Unit)

Figure 6:
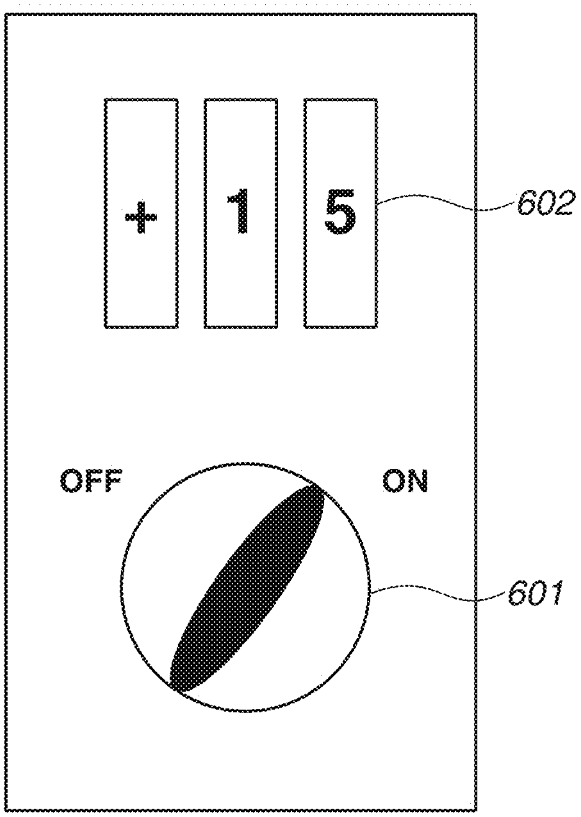
FIG. 6 is a diagram illustrating an operation unit included in the static elimination apparatus.

An operation unit 502 has a configuration as illustrated in FIG. 6. The user can make settings for the static elimination apparatus 200-3*a* through the operation unit 502. A mode setting switch 601 in FIG. 6 is used to switch whether to perform static elimination using the static elimination apparatus 200-3*a* (on or off). When the switch 601 is on, the control unit 501 performs control to execute a static elimination process using a static elimination processing unit 503. Even when the switch 601 is off, the control unit 501 performs control to execute the static elimination process if the HW priority setting 807 is set to disabled and the adjustment value 805 of the static elimination bias is set to other than 0 on the "adjustment of static elimination bias" screen 804 for sheet parameters in FIG. 8B. The adjustment dial 602 composed of a thumb rotary switch is used to regulate the intensity of the static elimination control to be performed when the mode setting switch 601 is on. The control unit 501 controls the adjustment dial 602 to be enabled only when the mode setting switch 601 is on. The adjustment value of the static elimination bias that is the intensity of the static elimination control set using the adjustment dial 602 can be adjusted in the same unit as that of the adjustment value set using the current adjustment value 805 on the "adjustment of static elimination bias" screen 804 described above.

The static elimination processing unit 503 is a portion that includes a static elimination roller 322, an ionizer 323, and a voltage application controller 321 for each of the static elimination roller 322 and the ionizer 323 and performs the static elimination process on a sheet conveyed to the portion. The control unit 501 achieves control for applying a voltage to the static elimination roller 322 and the ionizer 323 via the voltage application controller 321.

A ROM 504 stores a boot program for the static elimination apparatus 200-3*a*, a control program for the operation unit 502, and a static elimination processing program for the static elimination processing unit 503. The control unit 501 then appropriately loads a required program from the ROM 504 into a RAM 505 and executes the program.

Figure 7:
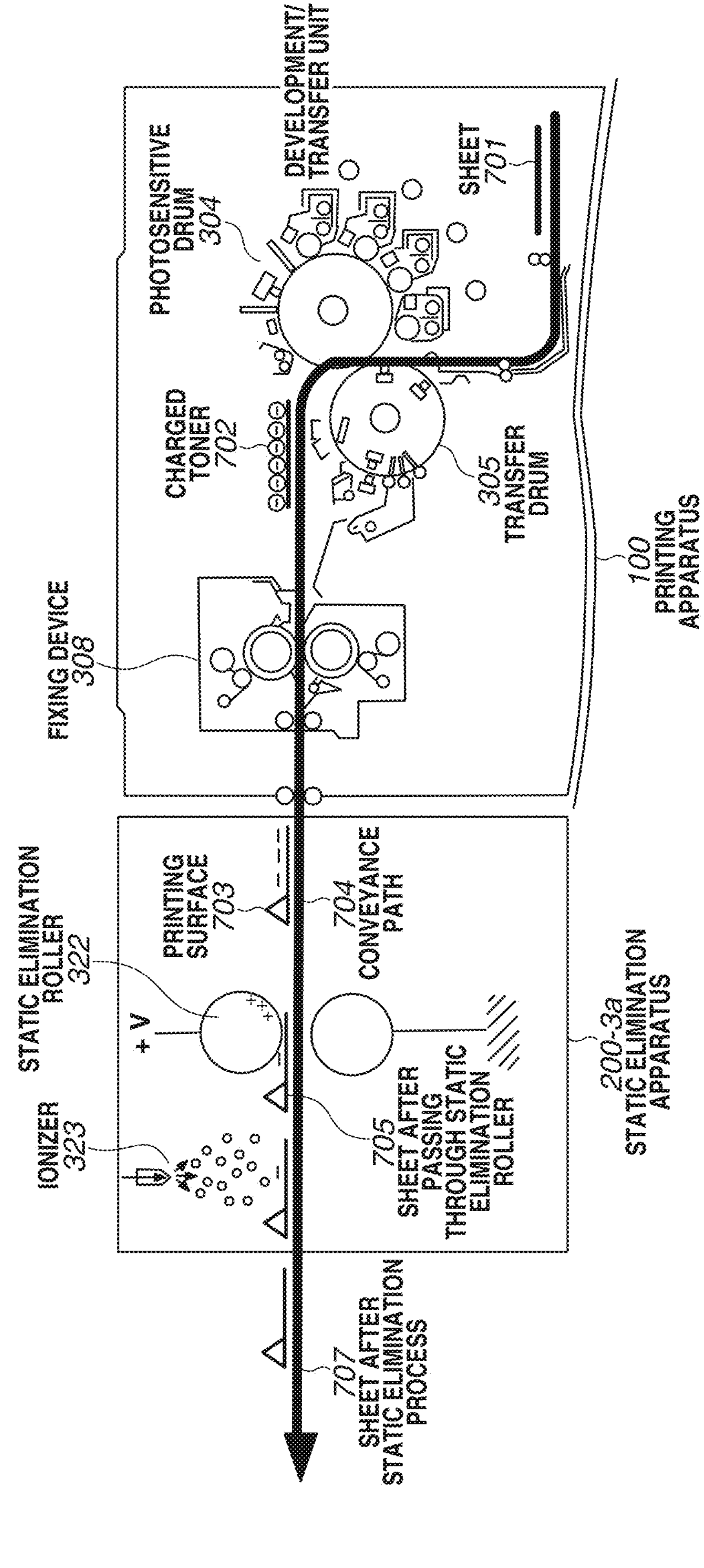
FIG. 7 is a schematic diagram for describing a static elimination process.

The static elimination process performed by the static elimination processing unit 503 is described with reference to FIG. 7. FIG. 7 is a diagram schematically illustrating the state where the static elimination apparatus 200-3*a* performs the static elimination process on a sheet subjected to a printing process by the printing apparatus 100. Components common to FIG. 3 are designated by the same numbers. First, a sheet 701 is conveyed to a development/transfer unit including the photosensitive drum 304 and the transfer drum 305 via a conveyance path 704, and toner is placed on the sheet 701. Charged toner 702 placed on the sheet 701 is negatively charged. After the charged toner 702 is fixed through the fixing device 308, the sheet 701 is next conveyed to the static elimination apparatus 200-3*a* in the state where a printing surface 703 of the sheet 701 is negatively charged. The static elimination apparatus 200-3*a* includes the positively charged static elimination roller 322. The static elimination apparatus 200-3*a* applies positive charges to the negatively charged printing surface 703 by contact static elimination using the roller 322, thereby canceling out the charged state. It is, however, assumed that negative charges that are not removed or positive charges that are conversely charged in the static elimination process by the static elimination roller 322 remain on a sheet 705 after passing through the static elimination roller 322. Accordingly, the static elimination apparatus 200-3*a* according to the present exemplary embodiment further includes the ionizer 323 downstream of the static elimination roller 322. The ionizer 323 is a device that generates a corona discharge by applying a voltage to an electrode needle included in the ionizer 323 and cancels out charging using ions generated by the corona discharge. As described above, the static elimination roller 322 roughly eliminates static, and the ionizer 323 further adjusts residual charges, whereby the sheet 707 after the static elimination process discharged from the static elimination apparatus 200-3*a* is in the state where the charging of the sheet 707 is canceled out.

The description returns to the cross-sectional view in FIG. 3. The static elimination apparatus 200-3*a* includes the static elimination roller 322 and a roller paired with the static elimination roller 322. The sheet conveyed to the static elimination apparatus 200-3*a* is conveyed while being nipped by both rollers and is subjected to the rough static elimination by the static elimination roller 322. Thereafter, the ionizer 323 executes the static elimination process on residual charges while the sheet is conveyed to outside the apparatus by conveyance rollers 324.

(Saddle Stitch Binding Machine)

Next, the saddle stitch binding machine 200-3*b* is described. Examples of sheet processing by the saddle stitch binding machine 200-3*b* include saddle stitch binding, a punching process, a cutting process, a shift sheet discharge process, a folding process, and a stapling process. These jobs are referred to as “saddle stitch binding jobs”.

In a case where a saddle stitch binding job is processed, first, the control unit 205 causes the saddle stitch binding machine 200-3*b* to convey a sheet for the job subjected to printing by the printing apparatus 100. Then, the control unit 205 causes the saddle stitch binding machine 200-3*b* to execute the sheet processing on the job. The control unit 205 then causes a sheet discharge destination Z of the saddle stitch binding machine 200-3*b* to hold a print product of the saddle stitch binding job subjected to the sheet processing by the saddle stitch binding machine 200-3*b*. There is a plurality of sheet discharge destination candidates for the sheet discharge destination Z. Since the saddle stitch binding machine 200-3*b* can execute a plurality of types of sheet processing, the sheet discharge destination candidates are used when the sheet discharge destination Z is divided according to the types of sheet processing. In the present exemplary embodiment, the detailed conveyance procedure of the saddle stitch binding job is not described.

(Printing Process)

Figure 9A:
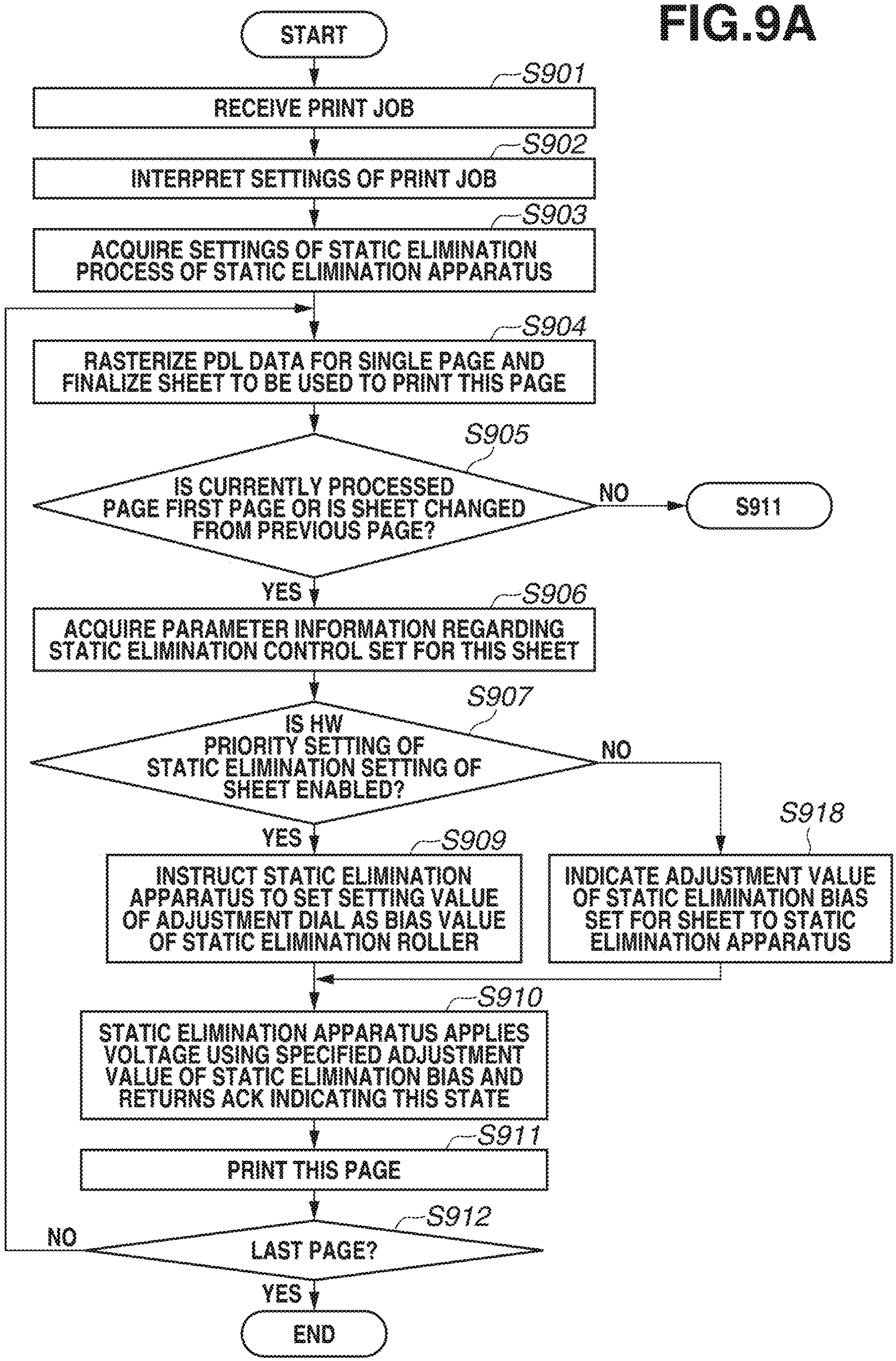
FIG. 9A is a flowchart for a static elimination control process according to a sheet on each page.

Next, a description is given of the process of performing printing through the use of the adjustment value of the static elimination bias set using the static elimination apparatus 200-3*a* and the adjustment value of the static elimination bias set with respect to each sheet according to the present exemplary embodiment, with reference to a flowchart in FIG. 9A. This process is achieved by the control unit 205, which is a CPU, loading a program stored in the ROM 207 or the HDD 209 into the RAM 208 and executing the program.

In step S901, the control unit 205 of the printing apparatus 100 receives a print job via the network 101 and the external I/F 202.

In step S902, the control unit 205 interprets the settings of the print job received in step S901 and grasps the specified contents, such as the number of copies to be printed, the sheet discharge destination, and the post-processing.

In step S903, the control unit 205 acquires the settings of the static elimination process of the static elimination apparatus 200-3*a*. In this process, the control unit 501 of the static elimination apparatus 200-3*a*, having received an inquiry from the control unit 205 of the printing apparatus 100, acquires the states of the mode setting switch 601 and the adjustment dial 602 of the operation unit 502 of the static elimination apparatus 200-3*a* and returns the states to the control unit 205 of the printing apparatus 100.

In step S904, the control unit 205 reads PDL data for a single page from the spooler, rasterizes the PDL data, and finalizes the type of a sheet to be used to print this page.

In step S905, the control unit 205 then determines whether the currently processed page is the first page. Otherwise, the control unit 205 determines whether the type of the sheet finalized in step S904 is changed from the previously processed page. If it is determined that the currently processed page is not the first page and the type of the sheet is not changed from the previously processed page (NO in step S905), the processing proceeds to step S911. If, on the other hand, it is determined that the currently processed page is the first page or the type of the sheet is changed from the previously processed page (YES in step S905), the processing proceeds to step S906.

The determination control in step S905 is thus performed, whereby it is possible to perform control to execute the process of acquiring print parameters of a target sheet and the adjustment of the static elimination bias only if the currently processed page is the first page or sheets are switched in the middle of printing. Such control is executed on each page included in the print job, whereby it is possible to achieve the static elimination control according to the sheet type on each page even if the print job includes a plurality of sheet types.

In step S906, the control unit 205 acquires parameter information regarding the static elimination control set for this sheet via the sheet data management unit 211. The HW priority setting or the adjustment value of the static elimination bias is acquired as information regarding the adjustment of the static elimination bias in the parameter information.

In step S907, the control unit 205 determines whether the HW priority setting acquired in step S906 is enabled. If it is determined that the HW priority setting made for this sheet is enabled (YES in step S907), the processing proceeds to step S909. If it is determined that the HW priority setting made for this sheet is not enabled, i.e., the adjustment value of the static elimination bias is acquired (NO in step S907), the processing proceeds to step S918.

If the HW priority setting is enabled, then in step S909, the control unit 205 instructs the control unit 501 of the static elimination apparatus 200-3*a* to set the setting value of the adjustment dial 602 as the bias value of the static elimination roller 322. The processing then proceeds to step S910.

If the HW priority setting is not enabled, i.e., the adjustment value of the static elimination bias is acquired, then in step S918, the control unit 205 indicates the adjustment value 805 of the static elimination bias for the specified sheet as the adjustment value of the static elimination bias to the control unit 501 of the static elimination apparatus 200-3*a*. The processing then proceeds to step S910.

In step S910, using the adjustment value of the static elimination bias received in step S909 or S918, the control unit 501 of the static elimination apparatus 200-3*a* actually applies a voltage with the static elimination bias to the static elimination roller 322 via the voltage application controller 321. The control unit 501 of the static elimination apparatus 200-3*a* then gives a notification indicating that a voltage with the static elimination bias is applied (Ack) to the control unit 205 of the printing apparatus 100. If the control unit 205 of the printing apparatus 100 receives from the control unit 501 of the static elimination apparatus 200-3*a* the notification that a voltage with the static elimination bias is applied, the processing proceeds to step S911.

In step S911, the control unit 205 performs control to print this page via the printer unit 203.

In step S912, the control unit 205 determines whether the printed page is the last page of the print job. If it is determined that the printed page is the last page (YES in step S912), this processing ends. If it is determined that the printed page is not the last page (NO in step S912), the processing returns to step S904 and the processing continues on the next and subsequent pages.

Figure 9B:
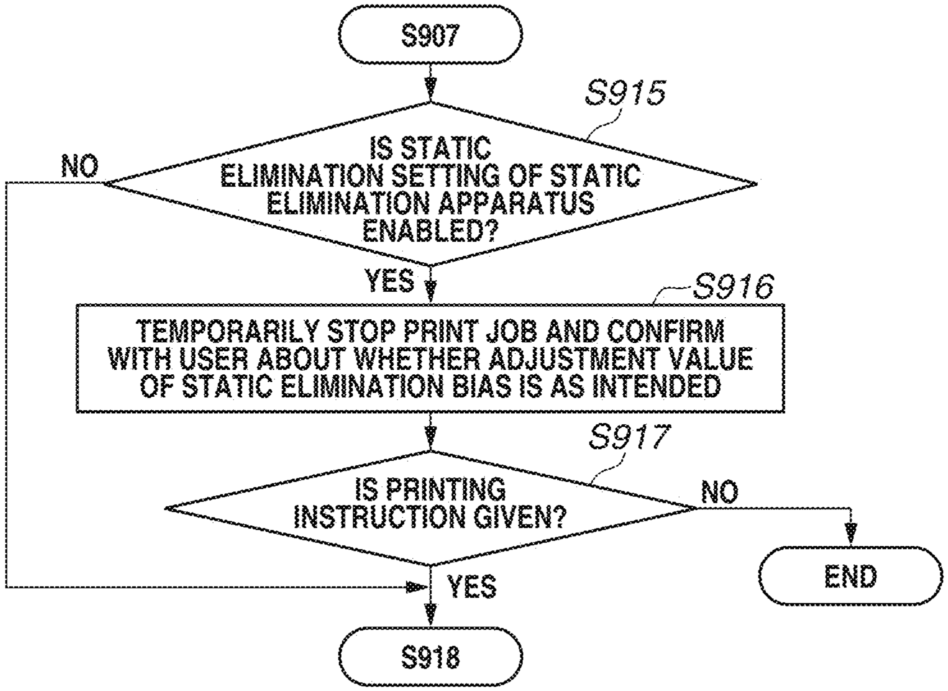
FIGS. 9B and 9C are flowcharts for the static elimination control process.
Figure 9C:
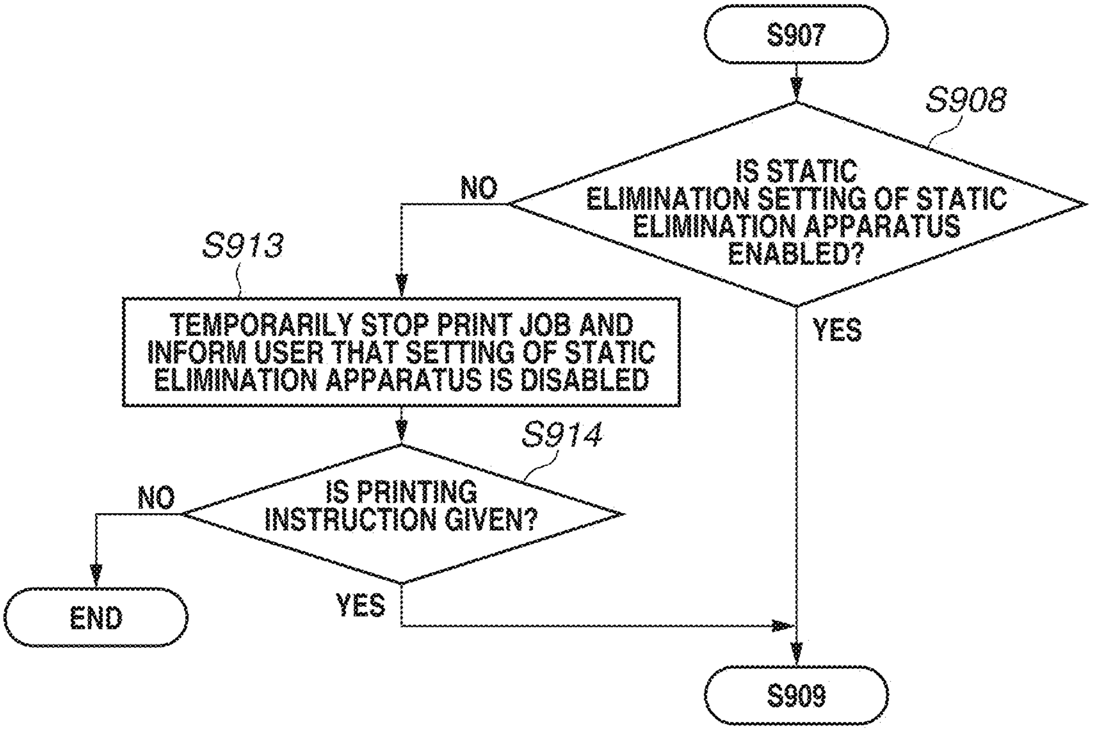

With reference to FIGS. 9B and 9C, a description is given below of an additional flow in a case where the static elimination setting is not correctly switched when the enabling and disabling of the HW priority for the static elimination setting are switched in step S907.

First, with reference to FIG. 9C, a description is given of the flow from step S907 to step S909 in a case where the determination is YES in step S907.

In step S908, the control unit 205 determines whether the static elimination setting of the static elimination apparatus 200-3*a* is enabled in the state of the mode setting switch 601 acquired in step S903. If it is determined that the static elimination setting of the static elimination apparatus 200-3*a* is enabled (YES in step S908), the processing proceeds to step S909.

In step S909, the control unit 205 instructs the control unit 501 of the static elimination apparatus 200-3*a* to set the setting value of the adjustment dial 602 as the bias value of the static elimination roller 322.

If it is determined in step S908 that the static elimination setting of the static elimination apparatus 200-3*a* is disabled (NO in step S908), the processing proceeds to step S913.

Figure 10A:
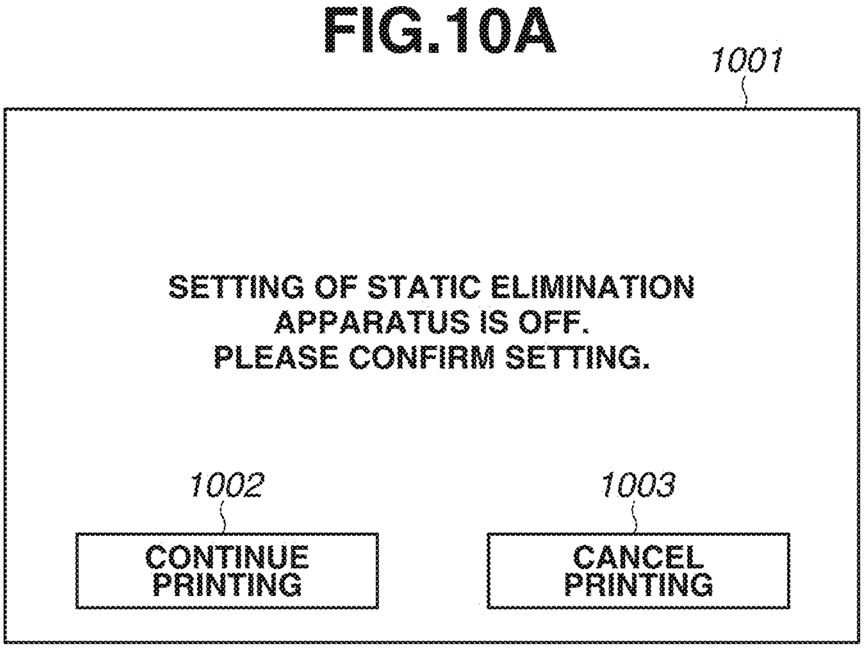
FIGS. 10A and 10B are diagrams illustrating screens for inquiring of a user about whether printing can be continued.

In step S913, the control unit 205 temporarily stops the print job and displays a screen 1001 illustrated in FIG. 10A on the operation unit 204, thereby informing the user that the setting of the static elimination apparatus 200-3*a* is disabled. The screen 1001 is a screen that is displayed in a case where the mode setting switch 601 of the static elimination apparatus 200-3*a* is in the off state even though the HW priority setting 807 is enabled for the sheet for which printing is specified, and the static elimination process may not be performed on the sheet from which static is to be eliminated. To continue the printing after the confirmation, or to change the static elimination process of the static elimination apparatus 200-3*a* to on and then give an instruction to continue the printing again, the user presses a [continue printing] button 1002. To cancel the printing once, the user presses a [cancel printing] button 1003. If it is determined that the [continue printing] button 1002 is pressed on the printing start confirmation screen 1001 in FIG. 10A (YES in step S914), the processing proceeds to step S909. If, on the other hand, it is determined that the [cancel printing] button 1003 is pressed (NO in step S914), the control unit 205 of the printing apparatus 100 cancels the print job according to the instruction, and the processing immediately ends.

If it is determined in step S907 that the HW priority setting made for this sheet is disabled (NO in step S907), the processing proceeds to step S915.

Next, with reference to FIG. 9B, a description is given of the flow from step S907 to step S918 in a case where the determination is NO in step S907.

In step S915, the control unit 205 determines whether the static elimination setting of the static elimination apparatus 200-3*a* is enabled in the state of the mode setting switch 601 acquired in step S903. If it is determined that the static elimination setting of the static elimination apparatus 200-3*a* is enabled (YES in step S915), the processing proceeds to step S916. If it is determined that the static elimination setting of the static elimination apparatus 200-3*a* is not enabled (NO in step S915), the processing proceeds to step S918.

Figure 10B:
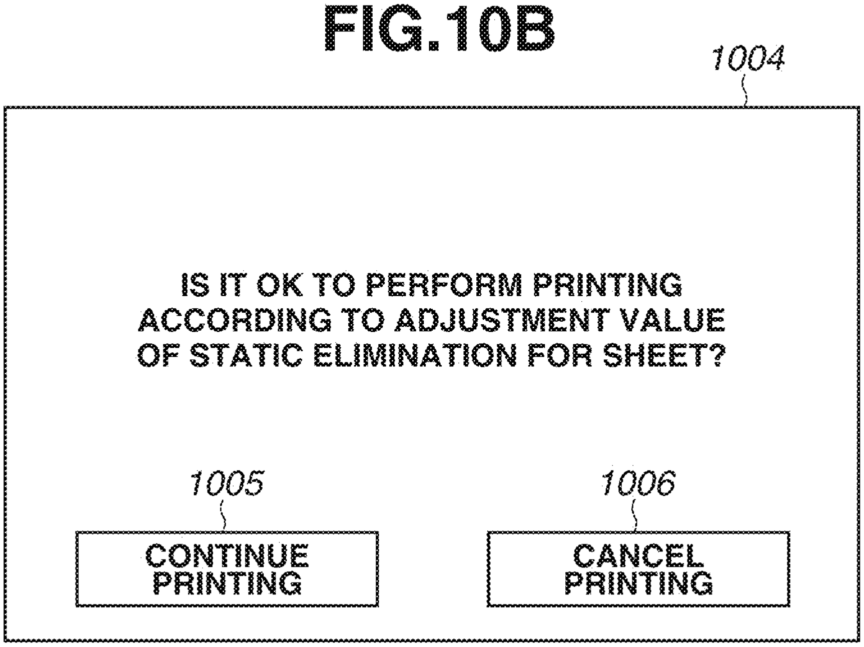

In step S916, the control unit 205 temporarily stops the print job and displays a screen 1004 illustrated in FIG. 10B on the operation unit 204, thereby performing display for confirming with the user about whether the adjustment value of the static elimination bias for the sheet is as intended by the user. The screen 1004 is an example of a screen displayed in a case where the mode setting switch 601 of the static elimination apparatus 200-3*a* is in the on state even though the HW priority setting 807 is disabled for the sheet for which printing is specified, and it is necessary to confirm whether the enabled adjustment value of the static elimination bias is as intended by the user.

In step S917, the user presses a [continue printing] button 1005 to continue the printing after the confirmation. The user presses a [cancel printing] button 1006 to cancel the printing once, or to perform the printing again after changing the setting of the sheet to enable not the setting of the sheet but the static elimination process of the static elimination apparatus. If it is determined that the [cancel printing] button 1006 is pressed on the printing start confirmation screen 1004 in FIG. 10B (NO in step S917), the control unit 205 of the printing apparatus 100 cancels the print job according to the instruction, and the processing immediately ends. If it is determined that the [continue printing] button 1005 is pressed on the printing start confirmation screen 1004 in FIG. 10B (YES in step S917), the processing proceeds to step S918.

In step S918, the control unit 205 indicates the adjustment value 805 of the static elimination bias for the specified sheet as the adjustment value of the static elimination bias, to the control unit 501 of the static elimination apparatus 200-3*a*. The processing then proceeds to step S910.

Although the static elimination setting of the sheet type is confirmed with respect to each page in the present exemplary embodiment, a flow may be employed in which sheet information and the static elimination setting regarding all the pages are acquired before the print job is started, and the user confirms the sheet information and the static elimination setting.

In the first exemplary embodiment, a description has been given of the process of performing printing by switching the adjustment value of the static elimination bias set using hardware of the static elimination apparatus and the adjustment value of the static elimination bias set using software with respect to each sheet.

As described in the related art, in a case where the sticking of sheets occurring due to charging with static is considered, the influence of an environmental change, particularly humidity, is large, and the extent of the influence of humidity differs depending on the moisture content of the sheet. Since the moisture content differs depending on the type of the sheet, there is also a sheet likely to be influenced by humidity. For example, plain paper or thick paper having a high moisture content is likely to be influenced by an environmental change, particularly humidity, and a sheet having a low moisture content, such as synthetic paper, is less likely to be influenced by an environmental change.

Figure 11:
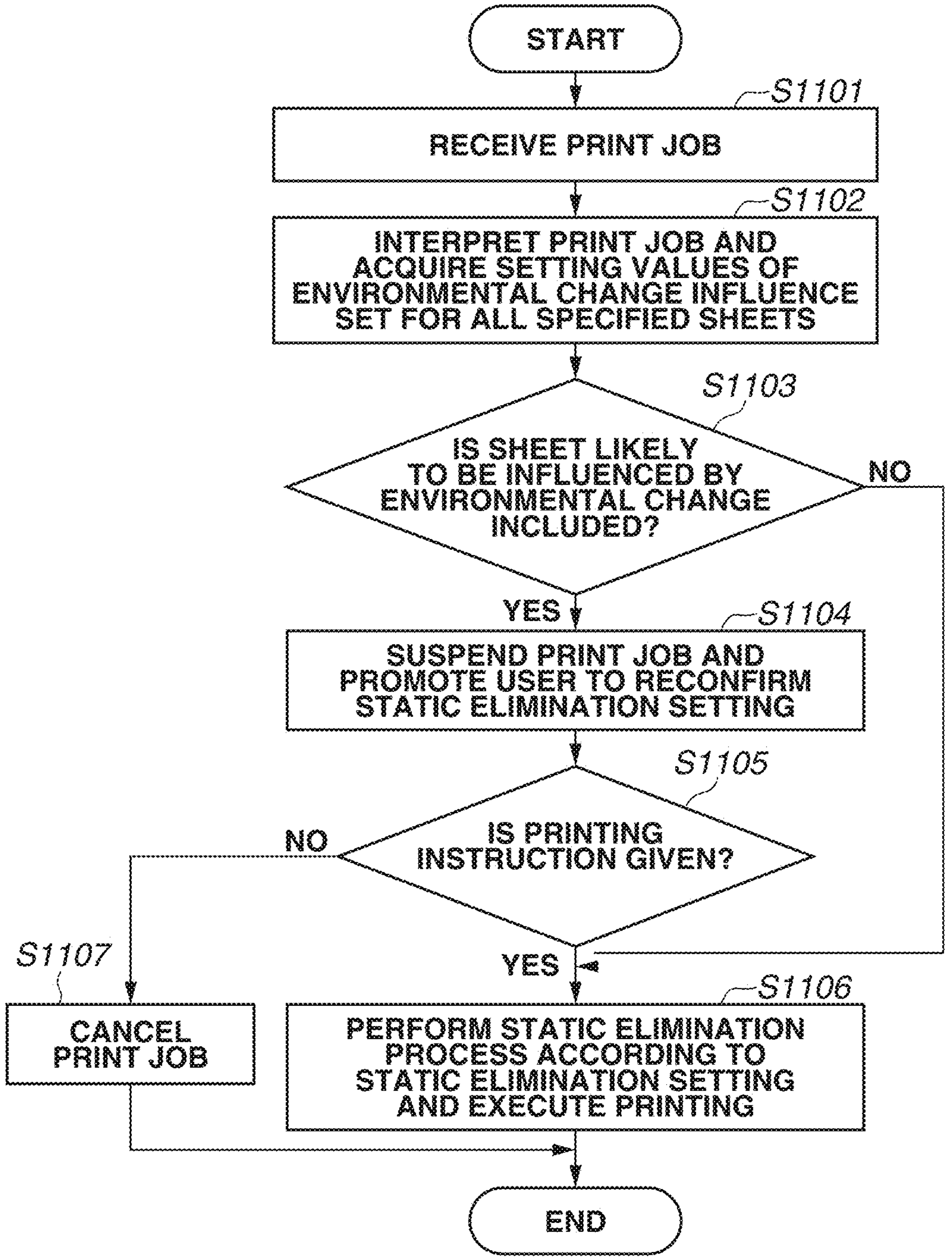
FIG. 11 is a flowchart for a static elimination control process considering an influence of an environmental change.

In a second exemplary embodiment, a description is given with reference to a flowchart in FIG. 11 of a printing flow of a sheet likely to be influenced by an environmental change. This printing process is achieved by the control unit 205, which is a CPU of the printing apparatus 100, loading a program stored in the ROM 207 or the HDD 209 into the RAM 208 and executing the program.

In step S1101, the control unit 205 of the printing apparatus 100 receives a print job via the network 101 and the external I/F 202.

In step S1102, the control unit 205 interprets the settings of the print job received in step S1101 and acquires each of the setting values of the environmental change influence set for all specified sheets via the sheet data management unit 211.

In step S1103, the control unit 205 confirms whether a sheet likely to be influenced by an environmental change is included in the sheet information acquired in step S1102. The determination of whether each sheet is a sheet likely to be influenced by an environmental change is made based on the setting of the item "environmental change influence" on the parameter list screen 801 for each sheet in FIG. 8A as a static elimination setting of each sheet. Regarding the item "environmental change influence", the relative magnitude of the item "environmental change influence" may be set in advance by the user on an environmental change influence setting screen (not illustrated), or information set by default in advance for the system may be used as it is. If it is determined that a sheet likely to be influenced by an environmental change is included (YES in step S1103), the processing proceeds to step S1104.

Figure 12:
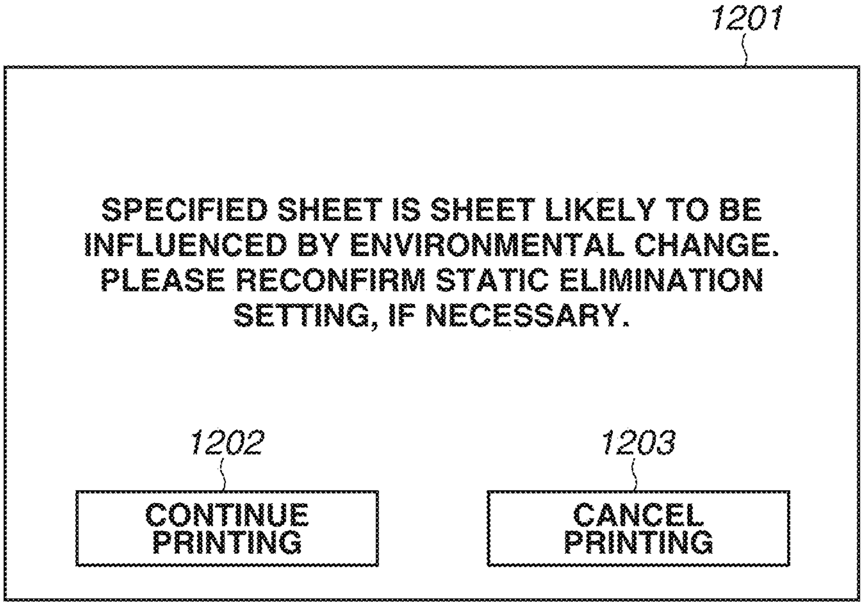
FIG. 12 is a diagram illustrating a printing start confirmation screen for inquiring of the user about confirmation of a static elimination setting.

In step S1104, the control unit 205 suspends the start of the print job and displays a screen 1201 illustrated in FIG. 12 on the operation unit 204, thereby prompting the user to reconfirm the static elimination setting. The screen 1201 is an example of a screen that should be displayed in a case where, since the sheet for which printing is specified is a sheet likely to be influenced by an environmental change, particularly humidity, there is a possibility that the static elimination setting is not appropriate because a change occurs in the environment where the static elimination setting is made. To continue the printing after the confirmation, the user presses a [continue printing] button 1202. To cancel the printing once, the user presses a [cancel printing] button 1203. If it is determined that the [continue printing] button 1202 is pressed on the printing start confirmation screen 1201 in FIG. 12 (YES in step S1105), the processing proceeds to step S1106.

If, on the other hand, it is determined that the [cancel printing] button 1203 is pressed (NO in step S1105), the processing proceeds to step S1107.

The control unit 205 cancels the print job according to the instruction, and the processing immediately ends.

In step S1106, the control unit 205 executes printing according to the static elimination setting that is made. Then, this processing ends.

In step S1107, the control unit 205 cancels the print job according to the instruction, and this processing immediately ends.

In the case of a sheet likely to be influenced by an environmental change, such as humidity, based on acquired sheet data in the printing process according to the first exemplary embodiment, the user may be allowed to directly adjust the static elimination bias of the static elimination process using an adjustment dial of the operation unit 502 according to the environment when the printing is performed.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-086808, which was filed on May 26, 2023 and which is hereby incorporated by reference herein in its entirety.

What is claimed is:

1. A printing apparatus comprising:

a printer that prints an image on a sheet;

one or more memories that store a respective static electricity elimination setting value with respect to each sheet of one or more sheets; and one or more processors that cause, in a case where a static electricity elimination setting value stored for the sheet is a numerical value, a static electricity elimination apparatus to eliminate static electricity from the sheet based on the numerical value, and to cause, in a case where a static electricity setting value stored for the sheet is a setting value indicating that a setting value of an input device of the static electricity elimination apparatus is used, the static electricity elimination apparatus to eliminate static electricity from the sheet based on the setting value set by using the input device.

2. The printing apparatus according to claim 1, further comprising an operation panel, wherein the one or more memories store, for each sheet of the one or more sheets, the respective static electricity elimination setting value input using the operation panel.

3. The printing apparatus according to claim 1, wherein, in a case where the setting value stored for the sheet is the setting value indicating that the setting value of the input device of the static electricity elimination apparatus is used, the one or more processors perform control to stop the printing performed by the printer before the printing is performed on the sheet.

4. The printing apparatus according to claim 3, further comprising a display that performs, in a case where the printing is stopped, display for causing a user to confirm a setting made by using the input device of the static electricity elimination apparatus.

5. The printing apparatus according to claim 4, wherein, after the display performs the display, the one or more processors perform control to resume the printing by the printer according to an instruction from the user.

6. The printing apparatus according to claim 1, wherein the one or more memories further store a grammage of each sheet.

7. The printing apparatus according to claim 1, wherein the one or more memories further store a surface property of each sheet.

8. A control method for controlling a printing apparatus, the control method comprising:

storing a static electricity elimination setting value with respect to each sheet of one or more sheets;

printing an image on a sheet; and in a case where a static electricity elimination setting value stored for the sheet is a numerical value, causing a static electricity elimination apparatus to eliminate static electricity from the sheet based on the numerical value, and in a case where a static electricity setting value stored for the sheet is a setting value indicating that a setting value of an input device of the static electricity elimination apparatus is used, causing the static electricity elimination apparatus to eliminate static electricity from the sheet based on the setting value set by using the input device.

9. A non-transitory computer readable storage medium for causing a computer to execute a control method for controlling a printing apparatus, the control method comprising:

storing a static electricity elimination setting value with respect to each sheet of one or more sheets;

printing an image on a sheet; and in a case where a static electricity elimination setting value stored for the sheet is a numerical value, causing a static electricity elimination apparatus to eliminate static electricity from the sheet based on the numerical value, and in a case where a static electricity setting value stored for the sheet is a setting value indicating that a setting value of an input device of the static electricity elimination apparatus is used, causing the static electricity elimination apparatus to eliminate static electricity from the sheet based on the setting value set by using the input device.

* * * * *